March 19, 1963 M. L. HAUPTMAN 3,081,639

FEED MECHANISM

Filed Dec. 7, 1960 2 Sheets-Sheet 1

INVENTOR.
Murray L. Hauptman
BY
Harness, Dickey & Pierce
ATTORNEYS

United States Patent Office 3,081,639
Patented Mar. 19, 1963

3,081,639
FEED MECHANISM
Murray L. Hauptman, 24501 Harding,
Oak Park 37, Mich.
Filed Dec. 7, 1960, Ser. No. 74,377
10 Claims. (Cl. 74—25)

This invention relates to feed mechanisms, and more particularly to devices for converting rotary motion to translatory motion.

It is an object of the present invention to provide an improved motion converting device having low friction properties but which is nevertheless extremely inexpensive to fabricate and easy to maintain.

It is another object to provide an improved arrangement of the above nature for converting rotary to translatory motion, in which the frictional losses do not increase with load and in which the input-to-output speed ratios may be varied between wide limits.

It is also an object to provide an improved speed mechanism having the above characteristics, in which provision is made for compensating for the effect of wear, so that a high output driving force may be exerted even after considerable use, and in which the degree of backlash is minimized.

Other objects, features and advantages of the present invention will become apparent from the subsequent description, taken in conjunction with the accompanying drawings, in which.

Figure 1:
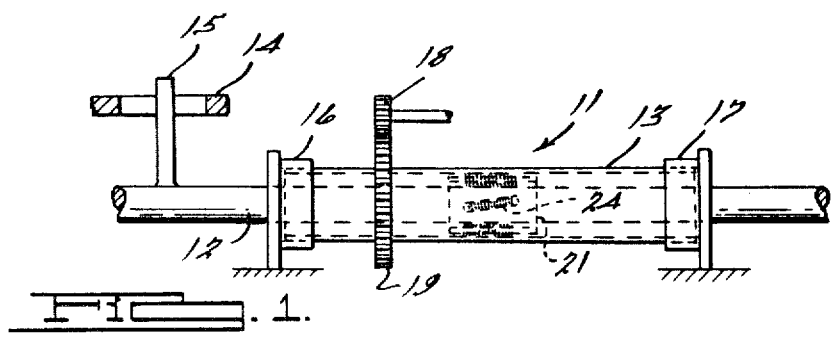
FIGURE 1 is a partially schematic side elevational view of a preferred embodiment of the feed mechanism of this invention.
Figure 2:
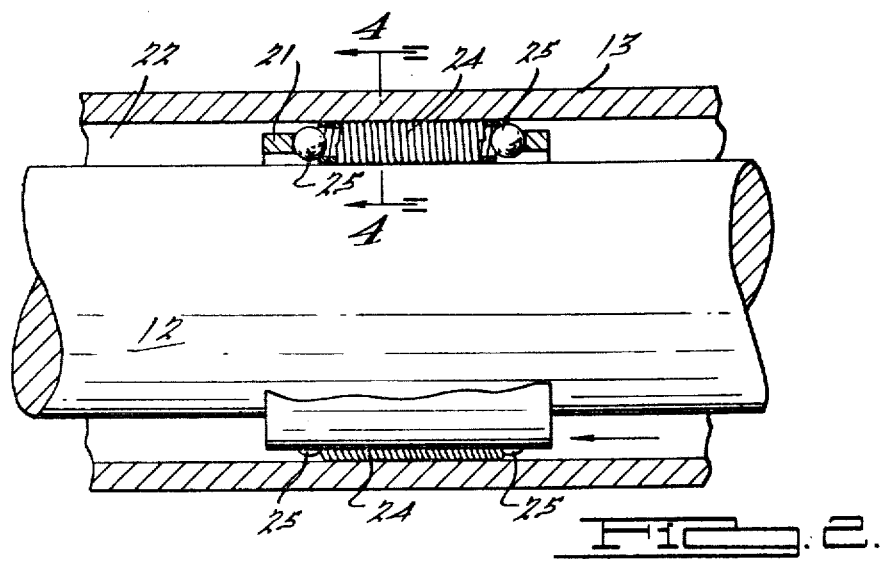
FIGURE 2 is an enlarged cross-sectional view in elevation of a central portion of the mechanism, showing the relationship among the inner and outer races, the cage and the rollers, with a portion of the section taken along the axis of a roller.

In general terms, the illustrated embodiments of the invention each comprises an inner race supported for translatory or reciprocating linear movement, and an outer race supported for rotation. These races may comprise a shaft and a tubular element respectively, and an annular cage is disposed in the space between these races. The cage has a plurality of circumferentially spaced slots inclined with respect to the longitudinal axis, and rollers are disposed within these slots and are in tight frictional contact with the races. The rollers are so constructed as to have contact along substantially their entire length with both the inner and outer races. In the preferred embodiment of the invention, the rollers comprise helical wire springs, tapered solid rollers or short rollers in tandem being shown in other embodiments. Upon rotary driving of the outer race, which is held against axial movement, the cage will move axially at a rate dependent upon the slot inclination. The inner race is held against rotation and will therefore move axially at approximately twice the rate of the cage.

Referring more particularly to the drawings, the device is generally indicated at 11 and comprises an inner race 12 and an outer race 13. Inner race 12 is shown in the form of a round shaft which may move axially, but is prevented from rotating by such means as a stationary slotted member 14 and a radial extension 15 on race 12 within slot 14. Outer race 13 comprises a tubular member or elongated sleeve surrounding race 12 and supported at its opposite ends by bearings 16 and 17 which permit free rotation of race 13 but prevent axial movement thereof. Driving means such as a driving pinion 18 and a gear 19 secured to race 13 may be provided for rotating the outer race.

Figure 3:
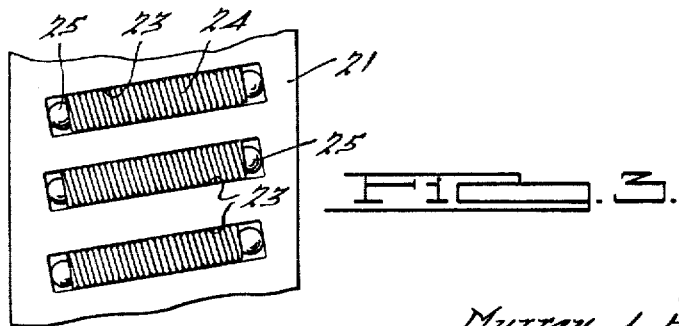
FIGURE 3 is a fragmentary developed plan view of a portion of the cage with the rollers (in the form of helical springs) disposed therein.

A cage 21 of annular shape is disposed in the space 22 provided between inner race 12 and outer race 13. This cage comprises a sleeve-like member considerably shorter than outer race 13 and having a wall thickness substantially thinner than the annular space between the races. Cage 21 is provided with a plurality of slots 23 extending through the wall thereof. Each slot is of elongated shape and is skewed or slanted with respect to the axis of cage 21, as seen in FIGURE 3. The degree of this angularity will be chosen according to the amount of lead, or input-to-output speed ratio, desired in the mechanism.

A roller 24 is disposed within each slot 23. In the embodiment of FIGURES 1, 2, 3 and 4, each roller comprises a helical coil spring of outside diameter sufficient to fit tightly between the facing surfaces of the inner and outer races, and with a desired preload depending upon the frictional forces which should be maintained and the expected wear of the surfaces. In other words, the unstressed outer diameter of each roller 24 is slightly greater than the space between the inner and outer races. The rollers are somewhat shorter than slots 23 and thrust bearings such as balls 25 are disposed between the ends of rollers 24 and the ends of the slots, to prevent the spring ends from catching on cage 21.

Figure 4:
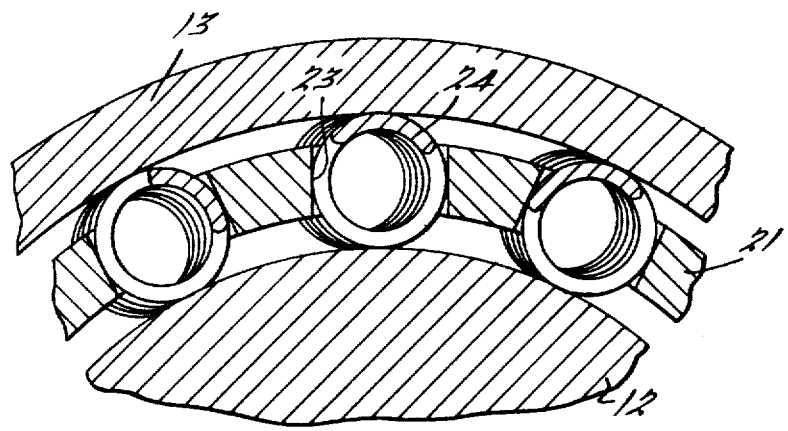
FIGURE 4 is an enlarged fragmentary cross-sectional view taken along the line 4—4 of FIGURE 2 and showing the roller guide slots.

In operation, assuming it is desired to move shaft 12 to the right in FIGURE 1, sleeve 13 is driven by gears 18, 19 in a direction such that it will move clockwise as shown in FIGURE 4. This will cause cage 21 to advance to the right in FIGURE 1 at a rate dependent upon the inclination of slots 23. The frictional engagement of rollers 24 with shaft 12 will cause the shaft to move axially at a speed approximately twice that of cage 21, shaft 12 being constrained against rotational movement by members 14, 15. If leftward movement of shaft 12 is desired, sleeve 13 will be rotated in the opposite direction.

It has been found that a mechanism constructed according to this invention has very low frictional losses because of the rolling contact between rollers 24 and their associated members, and that a relatively high output driving force in an axial direction may be exerted on shaft 12. This force is available even after considerable use of the mechanism due to the radial expansion characteristics of the springs which comprise rollers 24, and backlash is eliminated or substantially reduced.

Figure 5:
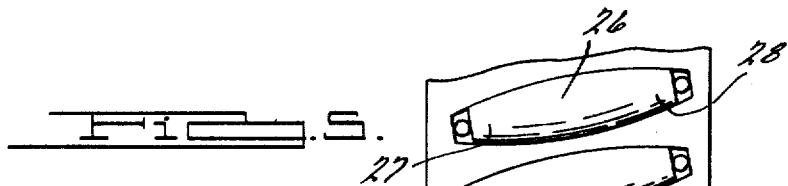
FIGURE 5 is a view similar to FIGURE 3 of a modified form of the invention using tapered solid rollers.
Figure 6:
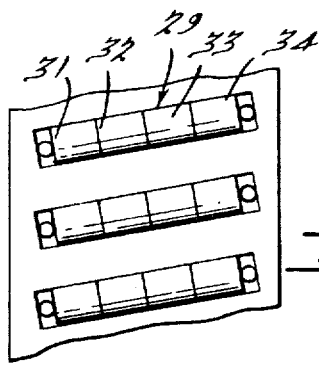
FIGURE 6 is a view similar to FIGURE 5 of a further modification using short rollers or discs in tandem within each slot.

FIGURE 5 shows a modified form of roller indicated at 26, this roller being in the form of a pin tapered toward both ends 27 and 28. A still further modification of the rollers is shown in FIGURE 6, this embodiment comprising a segmented type of roller generally indicated at 29 and comprising a plurality of segments in tandem relation, four such segments 31 to 34 being illustrated. The embodiments of both FIGURES 5 and 6 would make available the extended contact between the roller and the facing race surfaces which is an important factor in creating and maintaining the axial driving force on the inner race. Other forms for the rollers such as tubular members could also be used where appropriate.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a feed mechanism, an elongated inner race, an elongated outer race concentrically surrounding said inner race in spaced relation therewith, said races being of cylindrical shape, a cage disposed between said races, and a plurality of elongated rollers carried by said cage and having axes inclined with respect to the race axis, said rollers being in contact with the facing surfaces of said inner and outer races.

2. In a feed mechanism, an elongated inner race, an elongated outer race concentrically surrounding said inner race in spaced relation therewith, said races being of cylindrical shape, means for constraining one of said races against axial movement, means for constraining the other race against rotational movement, a cage disposed between said races, and a plurality of rollers carried by said cage and inclined with respect to the race axis, said rollers being in contact with the facing surfaces of said inner and outer races.

3. In a feed mechanism, an elongated inner race, an elongated outer race concentrically surrounding said inner race in spaced relation therewith, said races being of cylindrical shape, means supporting said outer race for rotational movement and preventing substantial axial movement thereof, means for preventing rotational movement of said inner race, a cage disposed between said races, and a plurality of rollers carried by said cage and inclined with respect to the race axis, said rollers being in contact with the facing surfaces of said inner and outer races.

4. In a feed mechanism, an elongated inner race, an elongated outer race concentrically surrounding said inner race in spaced relation therewith, said races being of cylindrical shape, a cage disposed between said races, and a plurality of rollers carried by said cage and inclined with respect to the race axis, said rollers being so shaped as to engage said facing race surfaces substantially along the entire extent of said rollers.

5. In a feed mechanism, an elongated inner race, an elongated outer race concentrically surrounding said inner race in spaced relation therewith, said races being of cylindrical shape, a cage of annular shape disposed between said races, a plurality of slots circumferentially spaced around said cage, said slots having a predetermined inclination with respect to the race axis, and a roller within each of said slots, said rollers each comprising a helically coiled member of spring-like material.

6. In a feed mechanism, an elongated inner race, an elongated outer race concentrically surrounding said inner race in spaced relation therewith, said races being of cylindrical shape, a cage of annular shape disposed between said races, a plurality of slots circumferentially spaced around said cage, said slots having a predetermined inclination with respect to the race axis, and a roller within each of said slots, said rollers each comprising a helically coiled member of spring-like material, the unstressed outer diameter of said members being slightly greater than the space between said races.

7. In a feed mechanism, an elongated inner race, an elongated outer race concentrically surrounding said inner race in spaced relation therewith, said races being of cylindrical shape, a cage of annular shape disposed between said races, a plurality of slots circumferentially spaced around said cage, said slots having a predetermined inclination with respect to the race axis, a roller within each of said slots, said rollers each comprising a helically coiled member of spring-like material, and a pair of spherical thrust bearings between the ends of each slot and the ends of the corresponding member.

8. In a feed mechanism, an elongated inner race, an elongated outer race concentrically surrounding said inner race in spaced relation therewith, said races being of cylindrical shape, a cage disposed between said races, and a plurality of rollers carried by said cage and inclined with respect to the race axis, said rollers being in contact with the facing surfaces of said inner and outer races, said rollers each comprising a solid member having a relatively thick central portion tapering toward the opposite ends thereof.

9. In a feed mechanism, an elongated inner race, an elongated outer race concentrically surrounding said inner race in spaced relation therewith, said races being of cylindrical shape, a cage disposed between said races, and a plurality of rollers carried by said cage and inclined with respect to the race axis, said rollers being in contact with the facing surfaces of said inner and outer races, said rollers each comprising a plurality of roller segments in tandem arrangement, each segment being of cylindrical shape.

10. In a feed mechanism, an inner race comprising an elongated cylindrical member, means constraining said member against rotational movement, an outer race comprising a tubular sleeve spaced outwardly from and surrounding said inner race, means rotatably supporting said outer race and preventing substantial axis movement thereof, means for rotating said outer race, a cage comprising an annular member disposed within the space between said races, a plurality of circumferentially spaced slots on said cage having a predetermined inclination with respect to the race axis, a roller in each of said slots, each roller comprising a helical coil spring having an unstressed external diameter slightly greater than the space between said races, and thrust bearing means disposed between the ends of each slot and the spring within said slot.

References Cited in the file of this patent

UNITED STATES PATENTS

| 2,215,678 | Weathers | Sept. 24, 1940 |
| 2,316,468 | Thomas | Apr. 13, 1943 |
| 2,966,070 | Wise | Dec. 27, 1960 |

FOREIGN PATENTS

| 846,786 | Great Britain | Aug. 31, 1960 |

UNITED STATES PATENT OFFICE
CERTIFICATE OF CORRECTION

Patent No. 3,081,639            March 19, 1963

Murray L. Hauptman

It is hereby certified that error appears in the above numbered patent requiring correction and that the said Letters Patent should read as corrected below.

Column 4, line 40, for "axis" read --- axial ---.

Signed and sealed this 19th day of November 1963.

(SEAL)
Attest:
ERNEST W. SWIDER

Attesting Officer

EDWIN L. REYNOLDS

Acting Commissioner of Patents

UNITED STATES PATENT OFFICE
CERTIFICATE OF CORRECTION

Patent No. 3,081,639                                  March 19, 1963

Murray L. Hauptman

It is hereby certified that error appears in the above numbered patent requiring correction and that the said Letters Patent should read as corrected below.

Column 4, line 40, for "axis" read -- axial --.

Signed and sealed this 19th day of November 1963.

(SEAL)
Attest:
ERNEST W. SWIDER

EDWIN L. REYNOLDS

Attesting Officer                              Acting Commissioner of Patents